(12) United States Patent
Burkhard et al.

(10) Patent No.: US 8,215,722 B2
(45) Date of Patent: Jul. 10, 2012

(54) METHOD FOR CALCULATING THE CONTROL CURRENT OF AN ELECTRICALLY CONTROLLABLE HYDRAULIC VALVE

(75) Inventors: Dieter Burkhard, Bingen-Büdesheim (DE); Mirco Loos, Spiesen-Elversberg (DE); Jochen Zimmermann, Oberwallmenach (DE)

(73) Assignee: Continental Teves AG & Co, OHG, Frankfurt (DE)

( * ) Notice: Subject to any disclaimer, the term of this patent is extended or adjusted under 35 U.S.C. 154(b) by 1146 days.

(21) Appl. No.: 11/665,853

(22) PCT Filed: Oct. 20, 2005

(86) PCT No.: PCT/EP2005/055425
§ 371 (c)(1),
(2), (4) Date: Feb. 28, 2008

(87) PCT Pub. No.: WO2006/042859
PCT Pub. Date: Apr. 27, 2006

(65) Prior Publication Data
US 2009/0037065 A1    Feb. 5, 2009

(30) Foreign Application Priority Data

Oct. 20, 2004 (DE) .......................... 10 2004 051 221
Oct. 20, 2005 (DE) .......................... 10 2005 050 645

(51) Int. Cl.
*B60T 13/00* (2006.01)
(52) U.S. Cl. ...................................... 303/20; 303/119.1
(58) Field of Classification Search ............... 303/115.1, 303/115.2, 119.1, 119.2, 20
See application file for complete search history.

(56) References Cited

U.S. PATENT DOCUMENTS

| | | | | |
|---|---|---|---|---|
| 6,030,055 | A * | 2/2000 | Schubert | 303/113.4 |
| 6,736,465 | B2 * | 5/2004 | Inoue | 303/119.1 |
| 6,851,764 | B2 * | 2/2005 | Giers et al. | 303/115.2 |
| 7,011,379 | B2 * | 3/2006 | Rader et al. | 303/119.2 |
| 7,140,699 | B2 * | 11/2006 | Gronau et al. | 303/113.4 |
| 7,699,411 | B2 * | 4/2010 | Nakaura et al. | 303/156 |
| 2007/0112537 | A1 * | 5/2007 | Gronau et al. | 702/105 |
| 2010/0121548 | A1 * | 5/2010 | Muller et al. | 701/77 |

FOREIGN PATENT DOCUMENTS

| | | |
|---|---|---|
| DE | 197 07 960 A1 | 9/1998 |
| DE | 19707960 | 9/1998 |
| DE | 197 27 945 A1 | 1/1999 |
| DE | 19727945 | 1/1999 |
| DE | 198 48 960 A1 | 4/2000 |
| DE | 19848960 | 4/2000 |
| DE | 101 42 040 A1 | 6/2002 |
| DE | 10142040 | 6/2002 |
| DE | 102 00 771 A1 | 8/2002 |
| DE | 10200771 | 8/2002 |
| DE | 102 24 059 A1 | 8/2003 |
| WO | WO 2004/101339 A1 | 11/2004 |

* cited by examiner

*Primary Examiner* — Bradley King

(57) ABSTRACT

A method shall render it possible that an especially favorable pilot control can be achieved with an electrically controllable hydraulic valve (10), in particular an analog/digital inlet valve of a friction brake of a motor vehicle brake system. To this end, an actuating current is applied to the hydraulic valve (10), which is determined by linking an available opening current characteristic curve ($I_{open}(\Delta P)_{table}$) of the hydraulic valve (10) to a correction value ($i_{grad}$), with the correction value ($i_{grad}$) being predetermined depending on a number of parameters that are characteristic of the hydraulic valve (10).

6 Claims, 2 Drawing Sheets

METHOD FOR CALCULATING THE CONTROL CURRENT OF AN ELECTRICALLY CONTROLLABLE HYDRAULIC VALVE

This application is the U.S. national phase of international PCT/EP05/55425 filed Oct. 20, 2005, which designated the U.S. and which claims the benefit of priority of German Patent Application Number 10 2005 050 645.3 filed Oct. 20, 2005 and German Patent Application Number 10 2004 051 221.3 filed Oct. 20, 2005. The contents of each of the aforementioned documents are incorporated herein in their entirely.

BACKGROUND OF THE INVENTION

The invention relates to a method for operating an electrically controllable hydraulic valve, in particular an analog/digital inlet valve of a wheel brake in a motor vehicle brake system, wherein an actuating current is applied to the hydraulic valve.

Brake systems of motor vehicles typically comprise a number of friction brakes being associated with the wheels of the motor vehicle. The brake pressure required for braking is usually built up by way of a brake pedal using a so-called booster, and is conducted by way of a master brake cylinder by means of brake fluid in hydraulic lines to the friction brakes or the brake cylinders, respectively. Brake pressure can also be built up by means of appropriate motor-and-pump assemblies in systems with brake force boosting. In conventional brake systems, the position of the brake pedal usually corresponds, however, with the position of the friction brakes or the braking performance of the motor vehicle, respectively.

In modern motor vehicle brake systems, it is however frequently necessary to electronically modify or electronically control the brake pressure, which prevails at the friction brakes, in order to realize safety systems, such as an anti-lock system (ABS) or an electronic stability program (ESP). Thus, a comparatively high-frequent brake pressure request of pulse-type variation prevails in an anti-lock system in order to prevent locking of the wheels and, thus, minimize the stopping distance. In this arrangement, friction brakes are released in the event of wheel lock by a reduction of the brake pressure and are re-applied shortly thereafter by an increase in pressure.

A dynamic control of the brake pressure of this type is typically realized by means of electrically controllable hydraulic valves, which are connected into the hydraulic lines that lead to the friction brakes. For regenerative brake systems equipped with an electric generator in addition to the friction brakes, valves of this type are also used in addition to other components in order to realize the brake functions. In so-called 'brake-by-wire' brake systems, wherein the friction brakes are maintained hydraulically uncoupled from the brake pedal, the detected braking request is realized or controlled also by way of electronically controllable hydraulic valves in the brake system.

The electronically controllable valves are usually actuated by way of an electronic control unit. In up-to-date generations of hydraulic control devices, so-called analog/digital valves are used at an increasing rate. These valves are customary switching valves, which can be operated in such a fashion though that analog pressure control can be performed. The valve is then moved by way of an electric coil through which alternating current is usually flowing. The valve movement induced by the magnetic field of the coil or the valve control, respectively, corresponds with the effective value of the coil current. Inlet valves of wheel brake cylinders are usually designed in such a way that a valve is open in its deenergized state so that the maximum opening cross-section of the valve is adjusted in the deenergized state. Actuation of such a valve by an actuating current causes the valve to continuously close with an increasing actuating current until the valve is closed completely when the so-called opening current is reached. In order to keep a valve of this type closed in a reliable manner, it is acted upon by an actuating current that is in excess of the opening current.

The opening current of a valve of this type usually depends on the difference in pressure across the valve. To be able to actuate a valve of this type e.g. in a brake control system in conformity with its targets and requirements, usually so-called opening current characteristic curves are stored in an associated control unit, in which the dependency of the opening current on the difference in pressure is represented in table form or also functionally.

In the operation of a valve of this type, it is typically acted upon by an actuating current, which should correspond with the desired opening position of the valve to a largest possible degree. Initially, the valve is acted upon by this actuating current in the way of a pilot control, and as the case may be, this current valve can be adapted by a subsequent control operation depending on determined actual parameters. Resorting to the opening current characteristic curve that is already provided, a valve of this type usually is initially acted upon by an actuating current, in consideration of the pressure gradient, which actuating current corresponds to the respective opening current, multiplied by an invariably selected correction term of e.g. 0.8. The control current, which is required for the adjustment of the actually desired opening position, is adjusted thereafter by way of the subsequent control.

However, it has turned out that especially for electronically controlled brake systems, e.g. in connection with ABS or ESP systems, the necessary recovery times or floating times can be comparatively long and, thus, can impair the operability of the mentioned system.

In view of the above, an object of the invention is to disclose a method of the above-mentioned type, which allows pressure control with a particularly quick reaction at a highest possible rate of accuracy using the valve described hereinabove. Another objective is to disclose a brake system that is well suited for implementing the method at issue.

SUMMARY OF THE INVENTION

With respect to the method, this object is achieved by the invention in that the hydraulic valve is acted upon by an actuating current, which is determined by linking an available opening current characteristic curve of the hydraulic valve to a correction value, with the correction value being predefined depending on a number of parameters that are characteristic of the hydraulic valve. To calculate the actuating current of the hydraulic valve, thus, a correction value is applied to an opening current of the hydraulic valve, which depends on a number of appropriate selected parameters of the hydraulic valve.

The invention is based on the reflection that for an especially quickly reacting and precise pressure control, already the actuating current for the hydraulic valve should be selected especially in conformity with requirements. As the pilot control of the hydraulic valve can already be improved thereby, the complexity and, thus, also the necessary duration of the subsequent control can be reduced or possibly even eliminated. In order to achieve this improvement of the pilot control, a determination or calculation of the actuating current should be executed which is especially flexible and conformed to requirements, in particular, also to the actual condition of the system. In order to keep the overall system particularly simple, resorting to the opening current characteristic curve when calculating the actuating current should be maintained, and the desired flexibility can be achieved by an appropriate choice of the correction current that is also taken into account.

Suitably, the correction value corresponds to the difference between 1 and the percentage of the requested opening current of the maximum opening current, when the hydraulic valve is completely opened.

To determine this correction, the percentage of the requested opening current of the maximum opening current, when the hydraulic valve is completely opened, is calculated preferably from the quotient of the requested pressure gradient and the maximum pressure gradient. The operating range between requested and maximum pressure gradient can vary when different differential pressures prevail.

A correction value calculated in this way is favorably multiplied by the opening current of the hydraulic valve. Alternatively, the working current can also be stored in a n-dimensional family of characteristics, with n corresponding to the number of the input variables.

In an especially suitable manner, a requested pressure gradient, the difference in pressure at the hydraulic valve, the hydraulic capacity of the wheel circuit associated with the hydraulic valve, and/or the flow resistance of the hydraulic circuit associated with the hydraulic valve are selected as characteristic parameters, depending on which the correction term is predefined. Appropriately, the hydraulic capacity in this arrangement is defined as the relation of the volume absorption of the volume change on the flow outlet side to the change in pressure and, hence, corresponds to the derivative of the volume/pressure characteristic curve with respect to the pressure.

The flow resistance depends, among others, on the viscosity of the hydraulic medium, the flow cross-section, and the design of the hydraulic system. The influencing variables referred to hereinabove are either known, or they can be determined by way of a measurement of the different pressures, or by way of measurements of the volume flow of the hydraulic medium.

The correction value favorably depends on the quotient of the product of the requested pressure gradient with the flow resistance of the hydraulic circuit associated with the hydraulic valve, and of the product of the pressure difference at the hydraulic valve and the hydraulic capacity of the wheel circuit associated with the hydraulic valve.

To provide the hydraulic capacity for calculating the pressure gradient, it is suitably stored pointwise or as an approximation function. In an alternative suitable improvement, the hydraulic capacity can also be calculated on-line from the derivative of the p-V-characteristic curve (at least in approximation).

To implement a valve-individual correction in a hydraulic system, the opening current characteristic curve is preferably corrected with a learning value, which depends on an error pressure value. A learning value can be calculated in a separate sub unit of the control system. In order to group a number of error pressure values or to ensure a continuous correction, respectively, a learning value is favorably determined according to an adaptive method.

The method is appropriately controlled and/or regulated by way of an electronic control unit.

A hydraulic valve, in particular an analog/digital hydraulic valve can be controlled preferably using the method described above. Hydraulic valves of this type favorably are components of a brake system, which is suitably controllable by means of the method described above.

The advantages of the invention especially involve that the determination of the actuating current by way of the respective opening current and a correction value, which is predefined depending on appropriate parameters, allows achieving an especially favorable actuation of the respective valve in a particularly flexible fashion in conformity with requirements and situations. In the type of a pilot control, which is especially in conformity with requirements and adapted to the situation, the valve can be actuated in a particularly rapid and reliable manner so that a subsequent control demand can be minimized or may possibly even be omitted.

Reducing the correlations to a closed algorithm further reduces the storage requirements during the time of pressure control because additional characteristic curves are not required. Another advantage of the method involves that the gradient characteristic curve need not be adapted in the application because all input data necessary for the calculation is already provided in the system or can be measured.

Resorting to the stored opening current characteristic curve in the way mentioned hereinabove further ensures that the calculation of the actuating current remains scalable in such a manner that only the opening current characteristic curve must be adapted of modified when the valve is changed, while the algorithm can be used unmodified in other respects.

BRIEF DESCRIPTION OF THE DRAWINGS

An embodiment of the invention will be described in detail by way of the accompanying drawings. In the drawings.

DETAILED DESCRIPTION OF THE DRAWINGS

Figure 1:
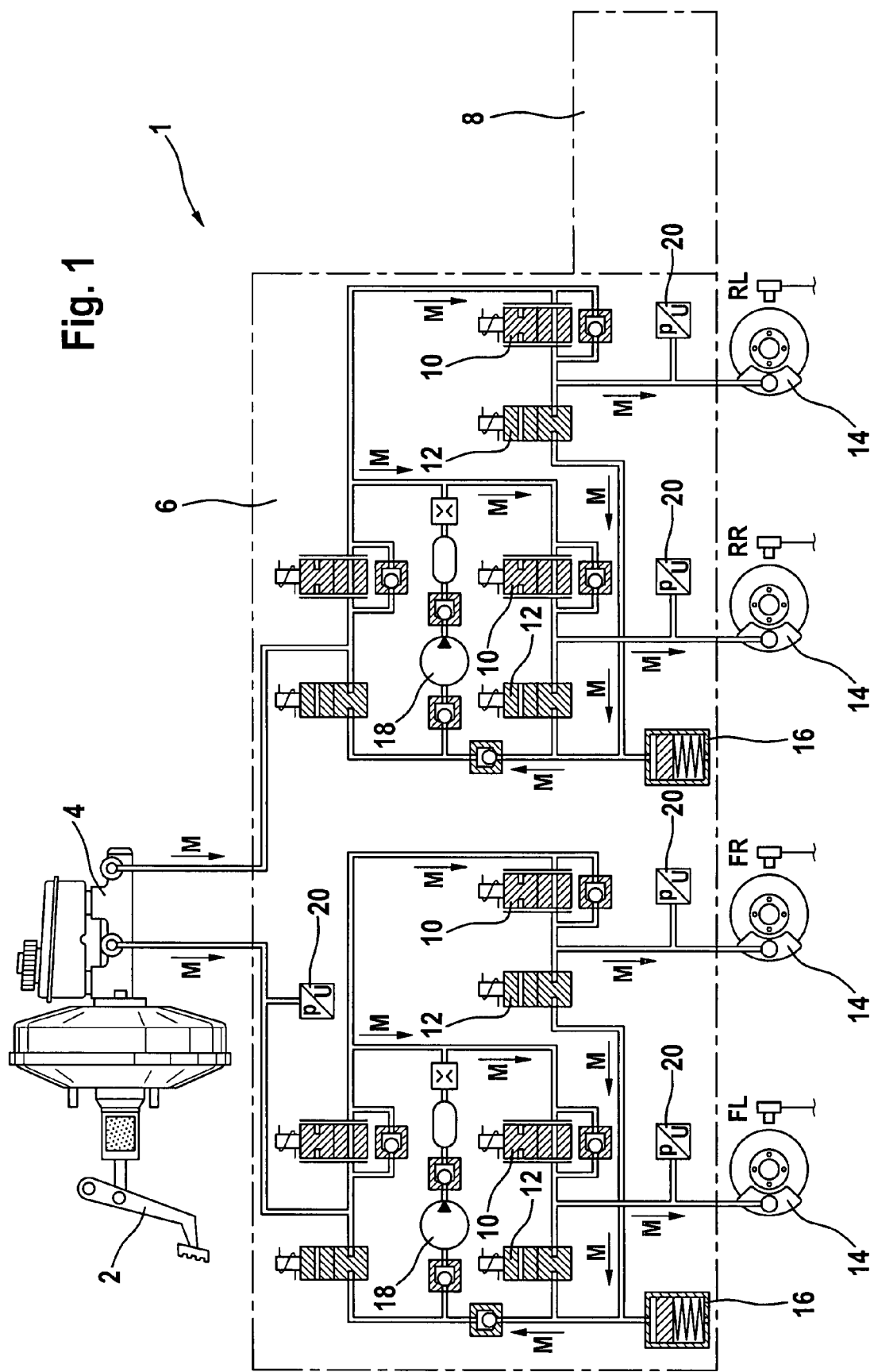
FIG. 1 shows a motor vehicle brake system 1.

Like parts have been assigned like reference numerals in all Figures.

FIG. 1 depicts a motor vehicle brake system 1 basically comprising a brake pedal 2, a tandem master cylinder 4, a valve block 6, and an electronic control unit 8. For the purpose of data calculation and control of the motor vehicle brake system 1, the electronic control unit 8 includes a microcontroller system used to electronically actuate the actuators and sensors comprised in the valve block 6, and to read data out. The valve block 6 includes two brake circuits, which, in turn, comprise two wheel pressure circuits with respectively one friction brake 14. An inlet valve 10 and an outlet valve 12 are arranged in each case in the wheel pressure circuits for each friction brake 14. The inlet valve 10 is an analog/digital normally open separating valve, and the outlet valve 12 is a normally closed electronic change-over valve.

In the outlet direction of the outlet valves 12, a low-pressure accumulator 16 and a motor-and-pump assembly 18 are further arranged. One pressure sensor 20 each is further arranged in the wheel pressure circuits in front of the friction brakes 14 and in the main brake line on the outlet side of the tandem master cylinder 4.

In the brake operation, the inlet valves 10 are opened, and hydraulic medium M is urged by way of the brake pedal 2 with the tandem master cylinder 4 to propagate to the friction brakes 14. When the brake pressure request is dynamically increased, additional brake pressure can be generated using the motor-and-pump assembly 18, while hydraulic medium M is discharged from the friction brakes 14 into the low-pressure accumulator 16 by opening of the outlet valves 12 when the brake pressure request is dynamically reduced.

Figure 2:
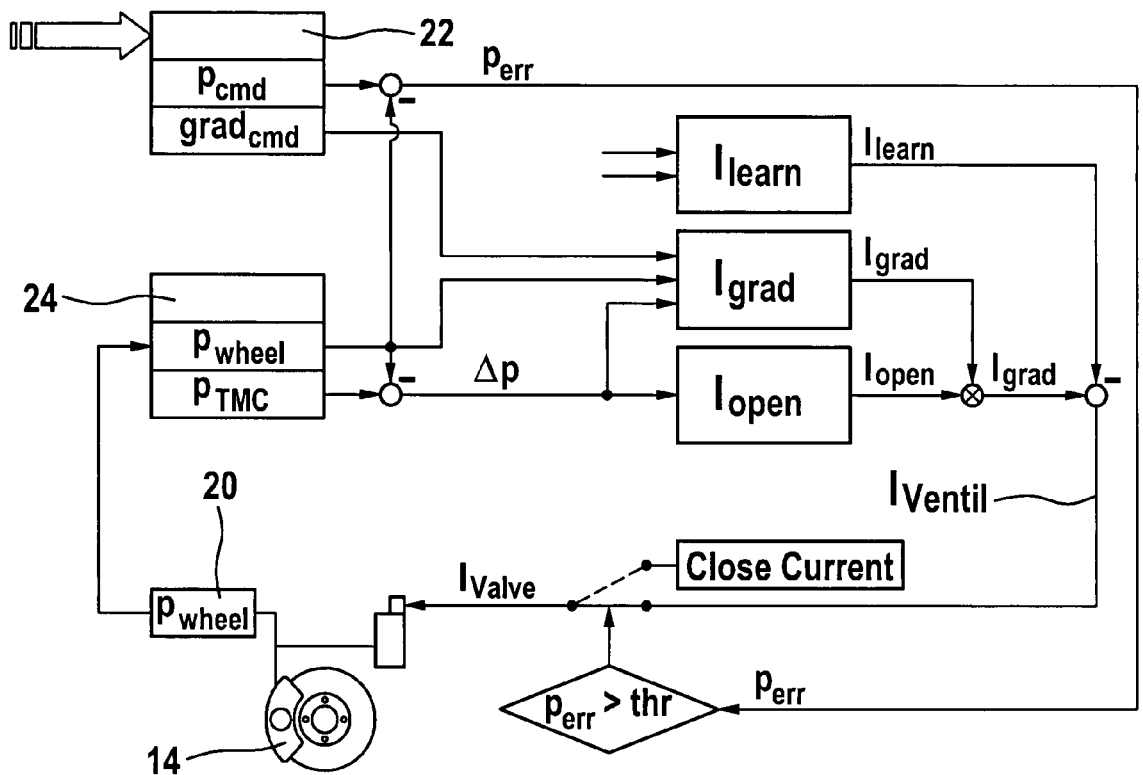
FIG. 2 is a schematic view of the sequence of control operations of an analog/digital inlet valve of the motor vehicle brake system of FIG. 1.

According to the invention, the electromagnetic inlet valves 10 are controllable by way of a pulse-width modulated current control in analog manner by way of the electronic control unit 8 to reach a high rate of precision. The calculation of the control current $I_{valve}$ is represented in FIG. 2. The Figure shows the method by which an inlet valve 10 is regulated by way of the electronic control unit. The control current $I_{valve}$ for the control coil of the inlet valve 10 is calculated, and only the calculation of the control current $I_{valve}$ of one inlet valve 10 will be described in the following because the calculation for the other inlet valves 10 is carried out in the same manner.

To this end, initially the opening current $I_{Open}$ is defined from the opening current characteristic curve $I_{open}(\Delta P)_{table}$ with the pressure difference $\Delta P$ of the inlet valve 10. The requested pressure gradient $grad_{CMD}$ and the brake pressure request $P_{CMD}$ are used as input quantities 22. The pressure $P_{Wheel}$ of a hydraulic medium M in a friction brake cylinder is measured by a pressure sensor 20 or alternatively determined using the mathematical pressure model 24. The pressure $P_{TMC}$ of the hydraulic medium M at the tandem master cylinder 4 is likewise determined using a pressure sensor or model 20.

A correction value $i_{grad}$, which depends on the requested pressure gradient grad and the pressure difference at the valve $\Delta P$, is applied to the opening current $I_{open}$. Further, the learning current $I_{learn}$ and a valve current $I_{valve}$ are included in the calculation of the CHD. The learning current $I_{learn}$ is determined according to an adaptive method for this purpose.

The maximum pressure gradient grad is calculated according to $$grad_{max} = \frac{\Delta P_{Valve} * C_{Whl}(P)}{R_{env}},$$

wherein $R_H$ is the flow resistance and $C_{Wheel}$ represents the hydraulic capacity of the adjoining hydraulic system. The hydraulic capacity $C_{Wheel}$ can be derived from the derivative of the volume V of the hydraulic medium M with respect to the pressure change dP:

$$C_{Wheel} = \frac{dV}{dP}.$$

Figure 3:
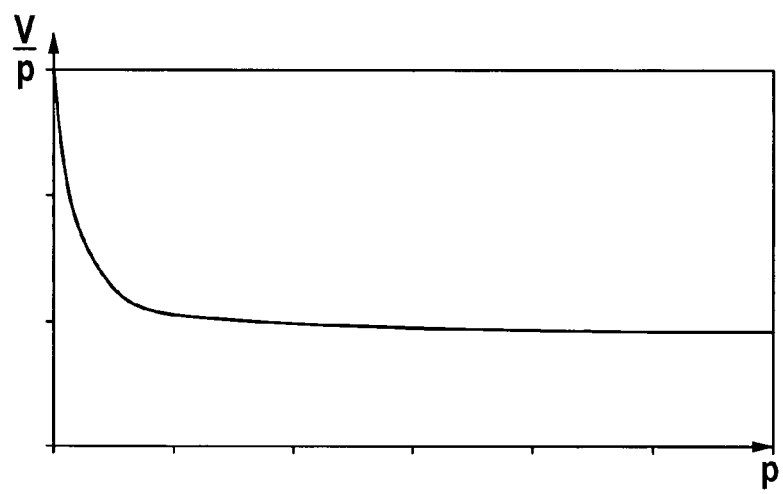
FIG. 3 shows the volume change dV of the hydraulic medium M of the inlet valve depending on the differential pressure Δp.

This relation is illustrated in FIG. 3 for better comprehension. In this respect, the percentage of the requested opening current of the maximum opening current, with the inlet valve 10 being completely opened, is calculated from the quotient of the requested pressure gradient $grad_{CMD}$ and the maximum pressure gradient $grad_{max}$, and this percentage value is subtracted from 100% so that $$i_{grad} = 1 - \text{Range}\left(\frac{grad_{CMD}}{grad_{max}}\right)$$

results, with the range function scaling the quotient to % and at 100% being limited upwards. The maximum pressure gradient $grad_{max}$, with the inlet valve 10 completely opened, is calculated from $$grad_{max} = \frac{\Delta P_{Valve} * C_{Whl}(P)}{R_{env}}.$$

The control current $I_{valve}$ then results from the product of the opening current $I_{open}$ and the correction value $i_{grad}$: $I_{valve}=I_{open}(\Delta P)_{table} \cdot i_{grad}$, and is predefined to the coil of the inlet valve 10.

LIST OF REFERENCE NUMERALS 1 motor vehicle brake system
2 brake pedal
4 tandem master cylinder
6 valve block
8 control unit
10 inlet valve
12 outlet valve
14 friction brake
16 low-pressure accumulator
18 motor-and-pump assembly
20 pressure sensor
22 input quantities
24 mathematical pressure model
M hydraulic medium

The invention claimed is:

1. A method for operating an electrically controllable hydraulic valve, such as an analog/digital inlet valve (10) of a friction brake in a motor vehicle brake system, the method comprising:
   determining an actuation current for a hydraulic valve by linking an available opening current characteristic curve ($I_{open}(\Delta P)_{table}$) of the hydraulic valve to a correction value ($i_{grad}$), wherein the correction value ($i_{grad}$) is predetermined depending on a quotient of the product of the requested pressure gradient and the flow resistance ($R_H$) of the hydraulic circuit associated with the hydraulic valve (10), and the product of the pressure difference ($\Delta P$) at the hydraulic valve (10) and the hydraulic capacity ($C_{Wheel}$) of the wheel circuit associated with the hydraulic valve (10); and
   applying the actuation current to the hydraulic valve (10).

2. A method for operating an electrically controllable hydraulic valve, such as an analog/digital inlet valve (10) of a friction brake in a motor vehicle brake system, the method comprising:
   determining an actuation current for a hydraulic valve by linking an available opening current characteristic curve ($I_{open}(\Delta P)_{table}$) of the hydraulic valve to a correction value ($i_{grad}$), wherein the correction value is predetermined depending on at least the hydraulic capacity ($C_{Wheel}$), and the hydraulic capacity ($C_{Wheel}$) corresponds to a relation of a volume change (dV) on the flow outlet side to a pressure change (dP) of a hydraulic medium (M); and
   applying the actuation current to the hydraulic valve (10).

3. A method for operating an electrically controllable hydraulic valve, such as an analog/digital inlet valve (10) of a friction brake in a motor vehicle brake system, the method comprising:
  determining an actuation current for a hydraulic valve by linking an available opening current characteristic curve ($I_{open}(\Delta P)_{table}$) of the hydraulic valve to a correction value ($i_{grad}$), wherein the correction value is predetermined depending on at least the hydraulic capacity ($C_{Wheel}$), and the hydraulic capacity ($C_{Wheel}$) is stored pointwise or as an approximation function; and
  applying the actuation current to the hydraulic valve (10).

4. A method according to claim 1, wherein the actuating current is corrected by a learning value ($I_{learn}$) that depends on an error pressure value ($P_{err}$).

5. A method according to claim 4, wherein the learning value ($I_{learn}$) is determined according to an adaptive method.

6. A method according to claim 1, wherein the actuating current ($I_{valve}$) is calculated from a product of an opening current determined from an opening current characteristic curve ($I_{open}(\Delta p)_{table}$) and the correction value ($i_{grad}$).

* * * * *